United States Patent
Yancey et al.

(10) Patent No.: US 10,410,003 B2
(45) Date of Patent: Sep. 10, 2019

(54) MULTIPLE CONTAINERS ASSIGNED TO AN APPLICATION

(71) Applicant: Apple Inc., Cupertino, CA (US)

(72) Inventors: Kelly B. Yancey, Mountain View, CA (US); Jacques Anthony Vidrine, San Francisco, CA (US); Eric Olaf Carlson, Mountain View, CA (US); Paul William Chinn, San Jose, CA (US); Simon P. Cooper, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 182 days.

(21) Appl. No.: 13/913,059

(22) Filed: Jun. 7, 2013

(65) Prior Publication Data

US 2014/0366157 A1   Dec. 11, 2014

(51) Int. Cl.
  *G06F 21/53*   (2013.01)
  *G06F 21/62*   (2013.01)
(52) U.S. Cl.
  CPC .............. *G06F 21/62* (2013.01); *G06F 21/53* (2013.01); *G06F 21/6245* (2013.01)
(58) Field of Classification Search
  CPC .......... G06F 21/60; G06F 21/62; G06F 21/53; G06F 21/6218; G06F 21/6245
  USPC ......................................................... 726/28
  See application file for complete search history.

(56) References Cited

U.S. PATENT DOCUMENTS

| | | | |
|---|---|---|---|
| 6,202,159 B1 * | 3/2001 | Ghafir ................. | G06F 9/5027 713/151 |
| 8,001,377 B2 | 8/2011 | Suzuoki et al. | |
| 8,146,084 B1 * | 3/2012 | Meketa ................ | G06F 9/468 718/100 |
| 8,261,361 B2 | 9/2012 | Liu et al. | |
| 9,274,974 B1 * | 3/2016 | Chen ................... | G06F 12/109 |
| 2008/0097998 A1 * | 4/2008 | Herbach ............... | G06F 9/00 |
| 2010/0172050 A1 * | 7/2010 | Perusse, Jr. ......... | G11B 15/689 360/71 |

(Continued)

OTHER PUBLICATIONS

Apple, App Sandbox Design Guide, Feb. 16, 2012, http://web.archive.org/web/20120417080851/http://developer.apple.com/library/mac/documentation/Security/Conceptual/AppSandboxDesignGuide/AppSandboxDesignGuide.pdf.*

(Continued)

*Primary Examiner* — Khang Do
(74) *Attorney, Agent, or Firm* — Womble Bond Dickinson (US) LLP

(57) ABSTRACT

The disclosed technology addresses the need in the art for assigning multiple containers to a single application. A container can be a specified area of a file system that an assigned application can access to store data, while other applications are restricted access to the container. In some instances, it may be beneficial for multiple applications to share some data, while still maintaining other data in a secure location, thus an application can be assigned to multiple containers, a personal container that can only be accessed by the application, and a shared container that can be accessed by multiple applications. Further, an application can be assigned an alternate container, in addition to the personal container. The alternate container can be used when an alternate user is using the client device, thus restricting the alternate user from accessing any sensitive data stored in the personal container.

25 Claims, 6 Drawing Sheets

(56) References Cited

U.S. PATENT DOCUMENTS

| | | | | |
|---|---|---|---|---|
| 2010/0217916 A1* | 8/2010 | Gao | ................ | G06F 12/109 711/6 |
| 2012/0159127 A1 | 6/2012 | Spradlin | | |
| 2013/0091557 A1 | 4/2013 | Gurrapu | | |
| 2013/0191326 A1* | 7/2013 | Sharma | ............ | G06F 17/30289 707/608 |
| 2014/0108793 A1* | 4/2014 | Barton | ................ | G06F 21/6218 713/165 |
| 2014/0165134 A1* | 6/2014 | Goldschlag | ............. | G06F 21/60 726/1 |
| 2014/0250505 A1* | 9/2014 | Kim | ................ | H04W 12/08 726/5 |
| 2014/0298420 A1* | 10/2014 | Barton | ................ | H04L 63/10 726/4 |
| 2014/0330990 A1* | 11/2014 | Lang | ................ | G06F 9/4555 710/14 |
| 2014/0331060 A1* | 11/2014 | Hayton | ................ | G06F 21/31 713/186 |
| 2014/0331285 A1* | 11/2014 | Desai | ................ | H04L 63/08 726/4 |
| 2014/0331297 A1* | 11/2014 | Innes | ................ | H04L 63/08 726/7 |
| 2014/0331333 A1* | 11/2014 | Frost | ................ | G06F 21/62 726/28 |
| 2014/0337466 A1* | 11/2014 | Li | ................ | H04L 63/0407 709/217 |
| 2014/0344806 A1* | 11/2014 | Suresh | ................ | G06F 9/45533 718/1 |

OTHER PUBLICATIONS

Kumar, Sharing data among iOS applications using UIPasteboard, Mar. 21, 2012, http://kmithi.blogspot.com/2012/03/sharing-data-among-ios-applications.html.*

Prevelakis, Vassilis and Spinellis, Diomidis, "Sandboxing Applications", published on Apr. 26, 2001, available at "http://www.dmst.aueb.gr/dds/pubs/conf/2001-Freenix-Sandbox/html/sandbox32final.pdf", last visited Jun. 6, 2013.

* cited by examiner

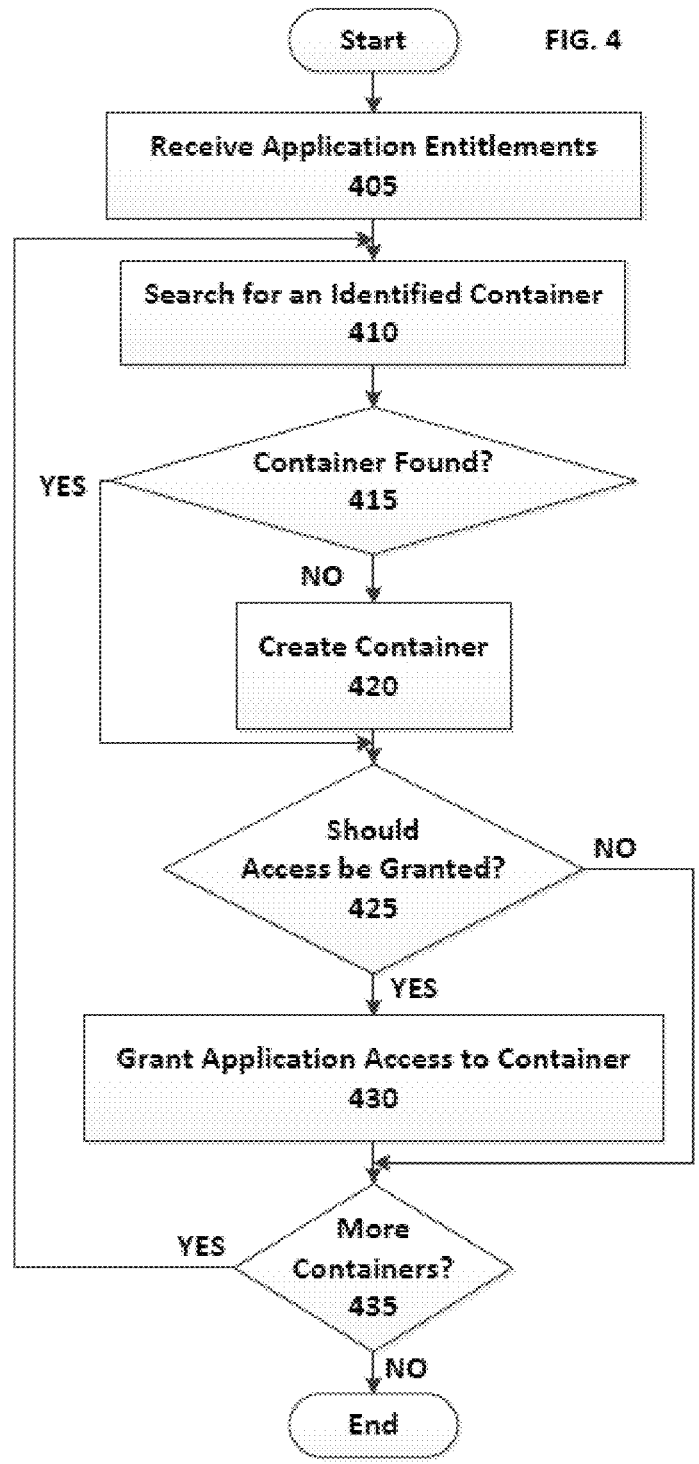

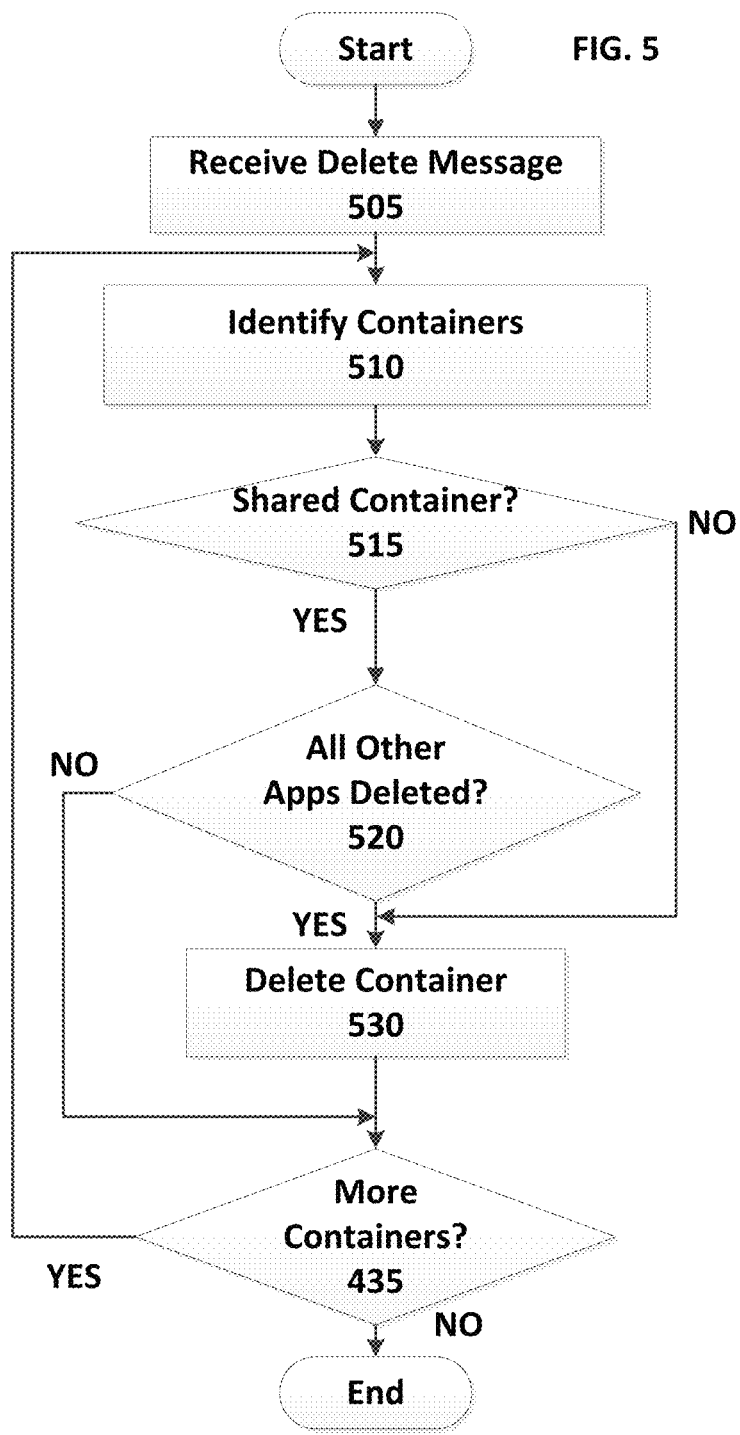

MULTIPLE CONTAINERS ASSIGNED TO AN APPLICATION

TECHNICAL FIELD

The present technology pertains to file system containers, and more specifically pertains to assigning multiple containers to a single application.

BACKGROUND

With modern computing devices, protecting sensitive data is of the utmost importance. To protect a user's sensitive data, an application can be executed in a sandboxed environment in which the application is granted access to only a specified portion of the file system. Further, other applications are restricted access to the specified portion of the file system. Thus, a user can be confident than an untrusted application cannot access and gather any sensitive data meant to be accessed by only the trusted application.

While running applications in a sandboxed environment provides additional security, there are also some limitations. For example, data cannot be shared across multiple applications, which in some instances could increase efficiency and performance. Further, while restricting an application to a single specified portion of the file system provides security from other applications, the sensitive data can still be accessible by an alternate user of the client device. Accordingly, there exists a need for an improved system.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for assigning multiple containers to a single application. A container can be a specified area of a file system designated to an application. The application can be allowed to access and store data in the application's designated container. Further, other applications cannot access a container assigned to a different application. Thus, each application is limited to their specified container and, further each application cannot access a container not assigned to the application.

In some instances, it may be beneficial for multiple applications to share some data with each other, while still maintaining other data in a secure location that cannot be accessed by other applications. To accomplish this, in some embodiments, an application can be assigned to multiple containers. For example, an application can be assigned to a personal container that can only be accessed by the application, and the application can be assigned to a shared container that can be accessed by multiple applications. Thus, data that can be shared amongst the multiple applications can be stored in the shared container, whereas data that should not be shared can be stored in the personal container.

Using assigned containers can provide data security across multiple applications, however sensitive data may still be accessed by an alternate user accessing an application from the client device. Thus, in some embodiments, an application can be assigned an alternate container in addition to the personal container. The alternate container can be used when an alternate user is using the client device, thus restricting the alternate user from accessing any sensitive data stored in the personal container.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates an exemplary method embodiment of assigning multiple containers to an application;

FIG. 5 illustrates an exemplary method embodiment of deleting a container.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for assigning multiple containers to a single application. A container can be a specified area of a file system designated to an application. The application can be allowed to access and store data in the application's designated container. Further, other applications cannot access a container assigned to a different application. Thus, each application is limited to their specified container and, further each application cannot access a container not assigned to the application.

In some instances, it may be beneficial for multiple applications to share some data with each other, while still maintaining other data in a secure location that cannot be accessed by other applications. To accomplish this, in some embodiments, an application can be assigned to multiple containers. For example, an application can be assigned to a personal container that can only be accessed by the application, and the application can be assigned to a shared container that can be accessed by multiple applications. Thus, data that can be shared amongst the multiple applications can be stored in the shared container, whereas data that should not be shared can be stored in the personal container.

Using assigned containers can provide data security across multiple applications, however sensitive data may still be accessed by an alternate user accessing an application from the client device. Thus, in some embodiments, an application can be assigned an alternate container, in addition to the personal container. The alternate container can be used when an alternate user is using the client device, thus restricting the alternate user from accessing any sensitive data stored in the personal container.

Figure 1:
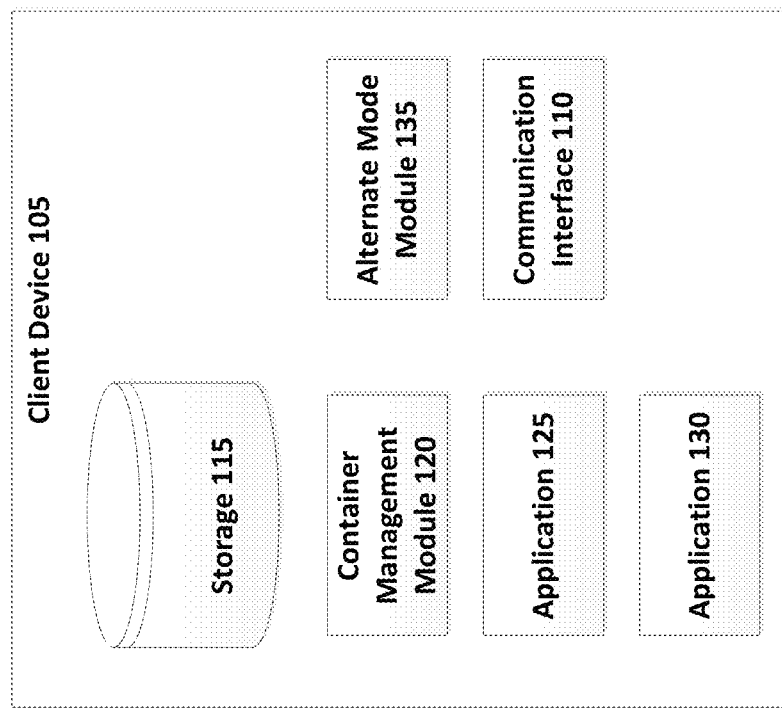
FIG. 1 illustrates an exemplary configuration of devices and a network in accordance with the invention.

FIG. 1 illustrates client device 105 configured to assign multiple containers to a single application. Client device 105 can be any type of general computing device capable of network communication with other computing devices. For example, client device 105 can be a personal computing device such as a desktop or workstation, a business server, or a portable computing device, such as a laptop, smart phone, or a tablet PC. Client device 105 can include some or all of the features, components, and peripherals of the computing device illustrated in FIGS. 6A and 6B. To facilitate communication with other computing devices, client device 105 can include communication interface 110 configured to receive a communication, such as a request, data, etc., from another computing device in network communication with client device 105 and pass the communication along to an appropriate module running on client device 105. Communication interface 110 can also be configured to send a communication to another computing device in network communication with client device 105.

As shown, client device 105 can include storage 115. Storage 115 can be any type of memory configured to store data used by client device 105 and/or any modules, applications, etc., running on client device 105. For example, in some embodiments, storage 115 can be a file system utilized by client device 105.

In addition to storage 115, client device 105 can also include container management module 120 configured to create and manage containers assigned to applications running on client device 105. A container can be a specified area of storage 110 that is assigned to a specific application running on client device 105. For example, a container can be a specified area of a file system that is assigned to an application running on client device 105. A container can be used to run an application in a sandboxed environment that restricts the application to the data stored in the container assigned to the application. Further, in some embodiments, only the application assigned to the container can access the data stored in the container. Thus, an application can only access the data stored in its assigned container, and the data stored in the container cannot be accessed from other applications not assigned to the container.

Container management module 120 can be configured to communicate with applications running on client device 105 to determine if the application is assigned a container, and to create a container for the application if one does not already exist. For example, client device 105 can include application 125 which, upon execution, can be configured to communicate with container management module 120 to declare the entitlements of application 125, including identifying any containers assigned to application 125.

The declaration of entitlements can include a unique container identifier that identifies a container assigned to application 125. Further, the declaration of entitlements can include container parameters describing the container, such as the size of the container. The size of the container can be the size of the specified area of storage 115 assigned to the application. The data in the declaration of entitlements can be included in an application by, for example, a developer of the application. Thus, the application is restricted to the entitlements given to the application by the developer.

Upon receiving the declaration of entitlements from application 125, container management module 120 can be configured to determine if the container identified by the declaration has already been created in storage 115. For example, container management module 120 can be configured to communicate with storage 115 to search for the unique container identifier included in the entitlement declaration received from application 125. If a container with the unique container identifier is not found, container management module 120 can determine that the container has not been created, upon which, container management module 120 can create the container according to the corresponding container parameters. Alternatively, if the container is found, container management module 120 can grant application 125 access to the container. Granting an application access to a container can include enabling the application to access, modify and store data in the container.

In some embodiments, it can be beneficial for multiple applications to share some data with each other, while maintaining other data in a secure container that can only be accessed by the one application. To accomplish this, an application can be assigned a personal container and a shared container. A personal container can be a container that can only be accessed by the application. A shared container can be a container that can be accessed by multiple applications.

To access both a personal and shared container, an application can identify multiple containers assigned to the application. For example, upon execution, application 125 can communicate with container management module 120 to declare entitlements, including two unique container identifiers. One of the unique container identifier can identify the personal container and the other unique container identifier can identify the shared container. Container management module 120 can search for the corresponding containers in storage 115 and create a container if it is not found, and grant application 125 access to the identified containers.

As an example of two applications sharing a container, client device 105 can also include application 130, which can be assigned to the shared container that application 125 is also assigned. For example, upon execution, application 130 can communicate with container management module 120 to declare entitlements that include unique container identifiers identifying the containers assigned to application 130. One of the unique container identifiers can identify the shared container that is also assigned to application 125. Container management module 120 can grant application 130 access to the shared container, resulting in both application 125 and application 130 being assigned to the same shared container and therefore being able to access data stored in the shared container.

Figure 2:
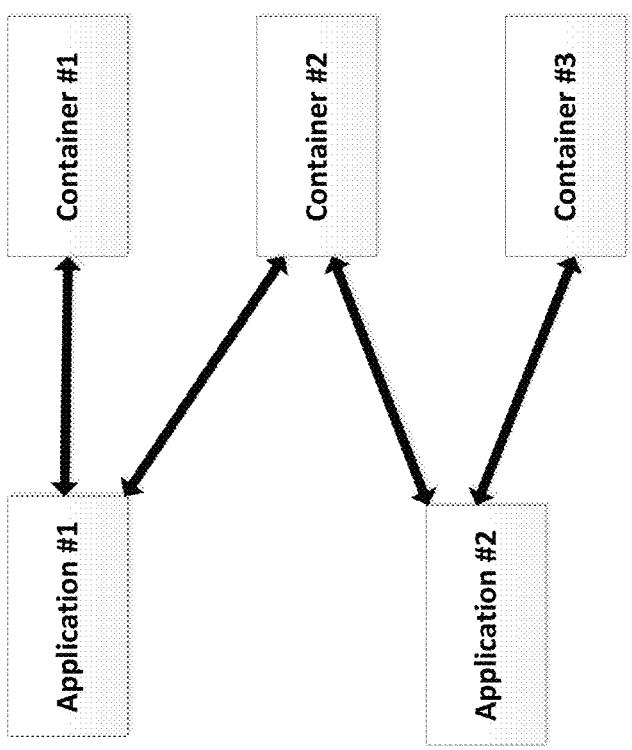
FIG. 2 illustrates two applications sharing a container.

FIG. 2 illustrates two applications sharing a container. As illustrated, application 1 and application 2 are each assigned to two containers. Application 1 is assigned to container 1 and container 2, and application 2 is assigned to container 2 and container 3. As shown, container 2 is a shared container that can be accessed by application 1 and application 2, whereas container 1 and container 3 are personal containers that can only be accessed by a single application. For example, container 1 can only be accessed by application 1 and container 3 can only be accessed by application 2. Therefore, application 2 cannot access data stored in container 1 and application 1 cannot access data stored in container 3. Furthermore, both application 1 and application 2 can access data stored in container 2.

Although application 1 and application 2 are illustrated as being assigned to only one shared container, this is just one possible embodiment and is not meant to be limiting. One skilled in the art would recognize that an application can be assigned to any number of shared containers. Further, a shared container can be assigned to any number of applications.

Returning to the discussion of FIG. 1, in addition to creating containers, container management module 120 can also be configured to delete containers. For example, upon detecting that an application has been deleted from client device 105, container management module 120 can be configured to delete containers assigned to the application. For example, container management module 120 can be configured to delete a personal container assigned to an application upon the application being deleted. Deleting a personal container assigned to the application can be performed when the application is deleted because the personal container can only be accessed by the deleted application.

Alternatively, a shared container can be accessed by multiple applications and thus, in some embodiments, should not be deleted unless all applications assigned to the shared container have been deleted. Accordingly, upon an application assigned to a shared container being deleted, container management module 120 can be configured to check to see if any other applications on client device 105 are assigned to the shared container. Container management module 120 can be configured to delete the shared container when no other applications on client device 105 are assigned to the shared container. Thus, the shared container will not be deleted if it is assigned to at least one application that is installed on client device 105.

In addition to assigning multiple containers to a single application to share data between multiple applications, in some embodiments, an application can be assigned to multiple containers to be used with different users. For example, an application can be assigned a first container that is used when the application is used by a primary user, and a second container that is used when the application is used by a secondary user.

To accomplish this, upon execution of an application, container management module 120 can be configured to determine the current user of client device 105, and grant the application access to the appropriate container based on the determined current user. For example, upon execution, application 125 can be configured to communicate with container management module 120 to declare entitlements of application 125, including unique container identifiers identifying the containers that are assigned to application 125. In addition to the unique container identifiers of the container that should be assigned to application 125, the declaration can also include container parameters identifying conditions upon which the application should be granted access to the container. For example, the container parameters can indicate which of the identified containers application 125 should be granted access to depending on the current user of client device 105.

In some embodiments, the container parameters can identify a specific user that must be logged in to client device 105 for application 125 to be granted access to the container. For example, client device 105 can be configured to be accessed by two specific user, requiring one user to log out for the other user to access client device 105. In this type of embodiments, container management module 120 can be configured to communicate with an operating system running on client device 105 to determine the current user of client device 105. Upon determining the current user of client device 105, container management module 120 can determine which of the assigned containers application 125 should be granted access to. Thus, application 125 can only access one of the assigned containers depending on the user logged into client device 105. Thus, one user cannot access sensitive data stored in a container associated with a different user.

In some embodiments, client device 105 can be configured to enable a primary user to put client device 105 in an alternate mode that protects sensitive data of the primary user from any alternate user using client device 105. For example, alternate mode can limit the applications, data, folders, etc., available to the alternate user of client device 105. In some embodiments, the primary user's sensitive information can be protected from an alternate user by granting the application access to an alternate container, rather than a primary container, when the alternate user is using client device 105. This can protect any sensitive data stored in the primary container from an alternate user.

To accomplish this, client device 105 can include alternate mode module 135 configured to put client device 105 into an alternate mode. For example, alternate mode module 135 can be configured to present an interface enabling a user to select to place client device 105 into an alternate mode. Upon receiving an input to place client device 105 into an alternate mode, in some embodiments, alternate mode module 135 can be configured to terminate any running applications on client device 105. Alternatively, in some embodiments, any running applications can be made inactive until client device 105 is returned to non-alternate mode.

Accordingly, upon client device 105 being placed into alternate mode, all applications will have to be executed, resulting in the application communicating with container management module 120 to declare entitlements identifying the containers assigned to the application as well as their corresponding container parameters. The container parameters can identify which mode client device 105 should be in, either guest or non-guest, for the application to be granted access to a container. Container management module 120 can then determine whether client device 105 is in alternate mode by, for example, communicating with alternate mode module 135 and/or the operating system of client device 105. Container management module 120 can then grant the application access to the appropriate container based on whether the client device 105 is in alternate mode or non-alternate mode.

In some embodiments, container management module 120 can be configured to periodically delete data stored in an alternate container. This can ensure that sensitive data stored in the alternate container by one guest cannot be accessed by another alternate user of client device 105. In some embodiments, the data stored in the alternate container can be deleted upon client device 105 being returned to non-alternate mode. For example, alternate mode module 135 can be configured to transmit a message to container management module 120 that client device 105 has been returned to non-alternate mode and, in response, container management module 120 can be configured to delete data stored in the alternate containers.

Alternatively, in some embodiments, container management module 120 can be configured to delete the data in the alternate containers at a scheduled time. For example, container management module 120 can be configured to delete data in the alternate containers daily, hourly, etc. Further, in some embodiments, container management module 120 can be configured to delete the data in the alternate containers upon receiving an input from the user requesting that the data be deleted. For example, the user can be presented with an interface enabling a user to select to delete the data in the alternate containers. Upon receiving a command indicating that the user has selected to erase the data in the alternate containers, container management module 120 can be configured to delete the data in the alternate containers.

Figure 3:
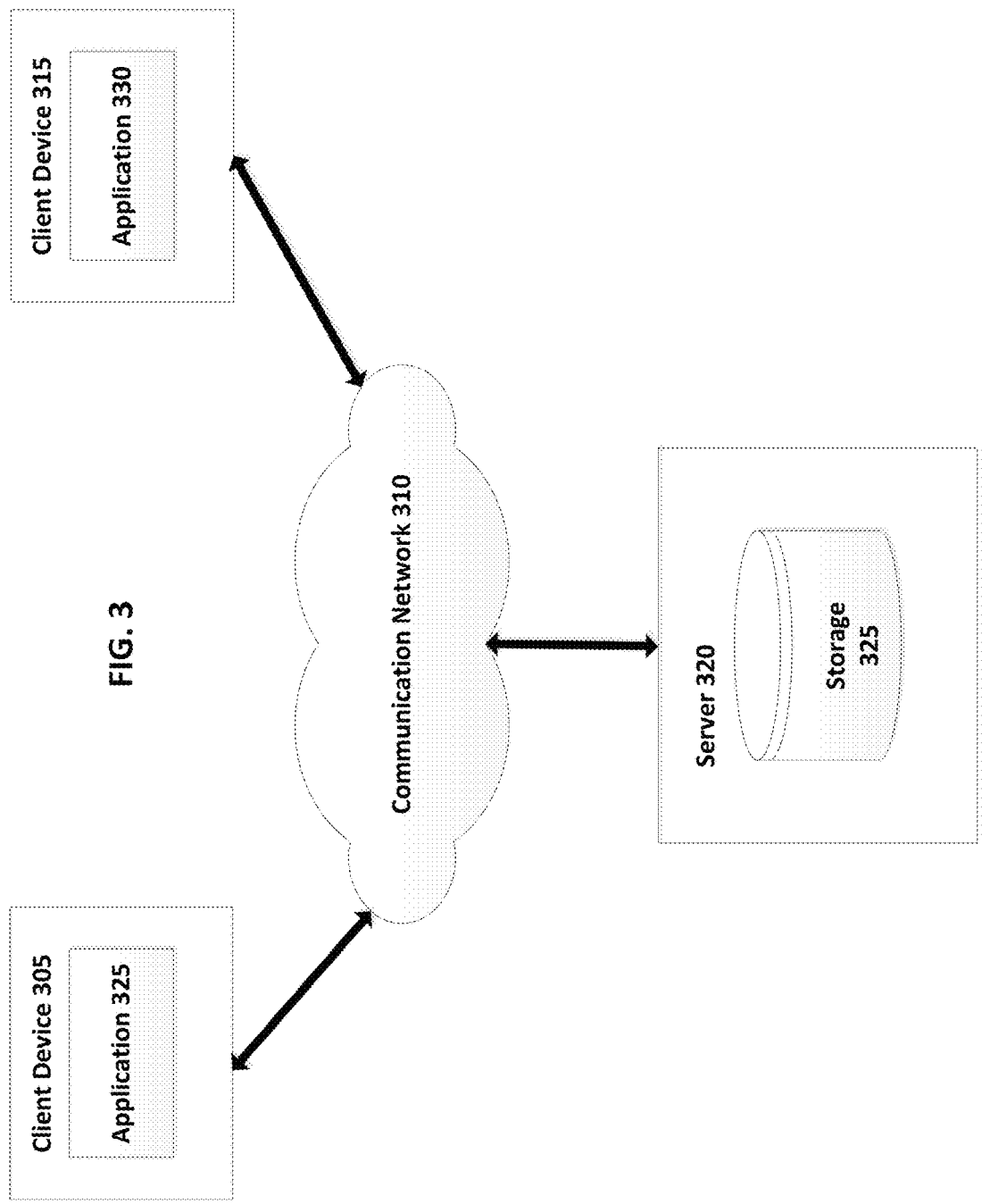
FIG. 3 illustrates a general purpose computing environment in which multiple computing devices can be configured to communicate with each other to send and receive data.

Although assigning multiple containers to an application is presented on a single computing device, this is only one embodiment and is not meant to be limiting. In some embodiments, the disclosed system can be implemented on multiple computing devices in network connection with each other. FIG. 3 illustrates a general purpose computing environment 300 in which multiple computing devices can be configured to communicate with each other to send and receive data. As illustrated, multiple computing devices can be connected to communication network 310 and be configured to communicate with each other through use of communication network 310. Communication network 310 can be any type of network, including a local area network ("LAN"), such as an intranet, a wide area network ("WAN"), such as the internet, or any combination thereof. Further, communication network 310 can be a public network, a private network, or a combination thereof. Communication network 310 can also be implemented using any number of communications links associated with one or more service providers, including one or more wired communication links, one or more wireless communication links, or any combination thereof. Additionally, communication network 310 can be configured to support the transmission of data formatted using any number of protocols.

As illustrated in FIG. 3, the exemplary system includes various computing devices in network communication with each other to send and receive data. In particular, FIG. 3 shows client device 305, client device 315 and server 320. Each computing device can be configured to assign multiple containers to an application.

In some embodiments, a shared container that can be accessed by multiple applications can be located on a computing device other than the client device on which the applications are executing. For example, client device 305 can include application 325 and client device 315 can include application 330. Application 325 and application 330 can both be assigned to a shared container that is stored in storage 325 on server 320. Accordingly, client device 305 and client device 315 can be in network communication with server 320 to access data in the shared container stored in storage 325.

In some embodiments, a personal container for each of the applications can be stored locally on their respective client device. For example, a personal container assigned to application 325 can be stored in memory on client device 305 and a personal container for application 330 can be stored in memory on client device 315. Thus, in this type of embodiment, only the data shared between application 325 and application 330 is stored on server 330 in the shared container stored in storage 325.

Alternatively, in some embodiments, the personal and shared containers can be stored on server 320. Thus, application 325 and application 330 would both communicate with server 320 to access their respective personal and shared containers.

FIG. 4 illustrates an exemplary method embodiment of assigning multiple containers to an application. As illustrated, the method begins at block 405 where a declaration of entitlements is received from an application. A declaration of entitlements can be received as a result of an application being executed. For example, each time the application is executed, the application can declare the application's entitlements. The declaration of entitlements can identify containers assigned to the application as well as container parameters defining the containers.

In some embodiments, the declaration can include a unique container identifier for each of the containers identified by the declarations. A unique container identifier can be an identifier that uniquely identifies a container. The container parameters can define the container by specifying the parameters of the container such as the size and location of the container. Further, in some embodiment, the container parameters can specify conditions that must be met for the application to be granted access to the container. For example, in some embodiments, the container parameters can specify a current mode that the client device must be in, for the application to be granted access to the container. Alternatively, in some embodiments, the container parameters can specify a specific user that must be logged in for the application to be granted access to the container.

Upon receiving the declaration of entitlements from the application, the method continues to block 410 where one of the containers identified in the declaration is searched for in memory. For example, a search can be performed in memory for the unique container identifier of the container.

If at block 415 the container is found, the method continues to block 425 where it is determined if the application should be granted access to the container. For example, if the container parameters indicate that the client device must be in an alternate mode for the application to access the container, a determination can be made as to whether the client device is or is not in the alternate mode. If at block 425 it is determined that the application should be granted access to the container, the method continues to block 430 where the application is granted access to the container. This can include enabling the application to access the container to retrieve, store and modify data.

The method then continues to block 435 where a determination is made as to whether there are any remaining containers identified by the declaration that have not yet been searched for in memory. If there are any remaining unsearched containers, the method returns to block 410. Alternatively, if there are no more remaining containers that need to be searched for in memory, the method ends.

Returning to block 425, if it is determined that the application should not be granted access to the container, for example, because the client device is not in the specified mode required by the container parameters, the method continues to block 435 without granting the application to the container.

Returning to the discussion of block 415, if the container identified by the unique container identifier is not found, the method continues to block 420 where the container is created based on the specified container parameters. For example, the container can be created in a location and be of the size specified by the container parameters.

FIG. 5 illustrates an exemplary method embodiment of deleting a container. As illustrated, the method begins at block 505 where a message to delete an application is received. The message can be received in response to a user selecting to delete the application.

Upon receiving the message to delete the application, the method continues to block 510 where a container assigned to the application is identified. For example, in some embodiments, the message can include unique container identifiers identifying the containers assigned to the application. Alternatively, in some embodiments, a container index listing the containers assigned to each application can be searched to identify each container assigned to the application.

The method then continues to block 515 where it is determined if the identified container is a shared container. For example, the delete message can indicate if there are other applications that can be assigned to the container. Alternatively, an index listing can identify all applications assigned to a container.

If at block 515 it is determined that the container is not a shared container, and thus the container is a personal container assigned to only the application to be deleted, the method continues to block 525 where the container is deleted.

However, if at block 515, it is determined that the container is a shared container, meaning that the container is assigned to multiple applications, the method continues to block 520 where it is determined if any other applications assigned to the container are present on a client device that can access the container. For example, a search can be performed for the applications that can be assigned to the container. If at block 520 it is determined that the other application are not present, the method continues to block 525 where the container is deleted.

If, however, one of the other applications is present, meaning that another application is using the shared container, the method continues to block 530 without deleting the container.

At block 530, the method determines whether there are any further containers assigned to the application identified for deletion. If there are more containers, the method returns to block 510. If there are no further containers, the method ends.

Figure 6A:
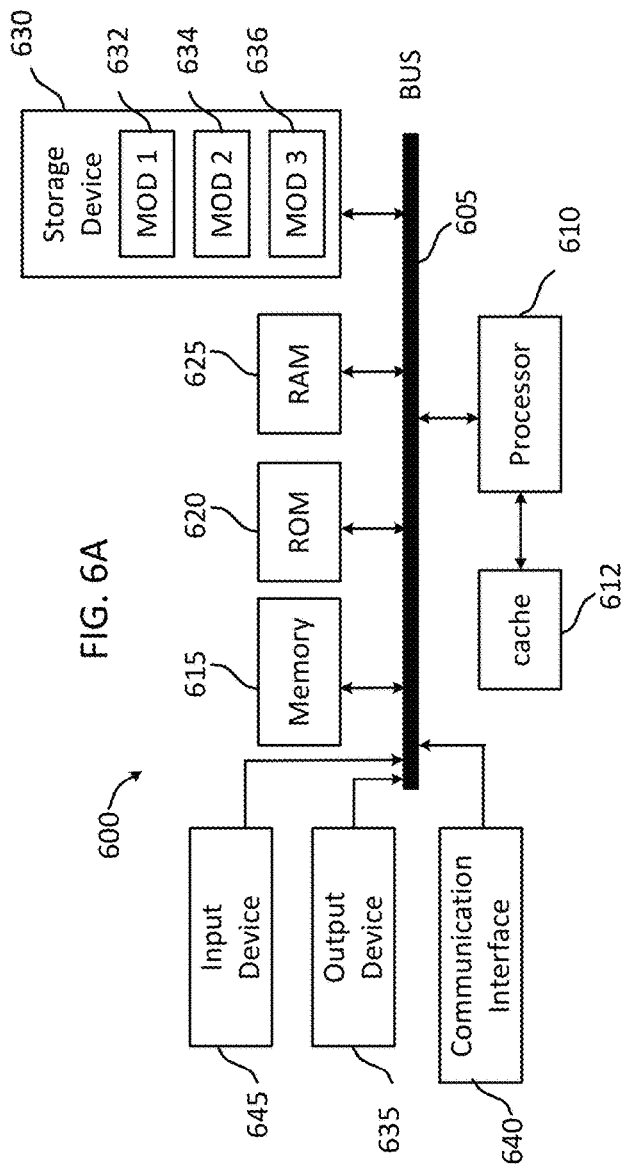
FIGS. 6A and 6B illustrate exemplary possible system embodiments.
Figure 6B:
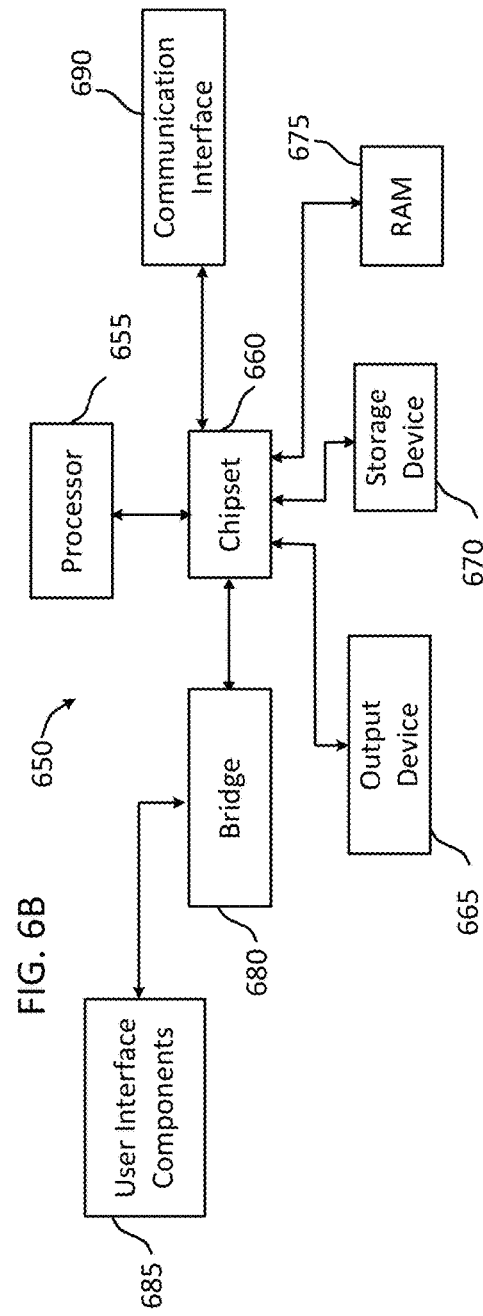

FIG. 6A, and FIG. 6B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:

receiving, by a container manager, from a first application installed on a client device, a declaration of application entitlements included in the first application that identifies one or more containers assigned to the first application that the first application is entitled to access, the declaration of application entitlements including a personal container identifier identifying a personal container assigned to the first application, and a shared container identifier identifying a shared container assigned to the first application and a second application, wherein the personal container is a first specified portion of memory that is only assigned to the first application and the shared container is a second specified portion of memory that is assigned to the first application and to the second application, wherein the second application includes a declaration of entitlements having the shared container identifier indicating that the second application is entitled to access the shared container, wherein the first application is run in a sandboxed environment that restricts the first application to the data stored in the one or more containers identified in the declaration of application entitlements, and wherein the shared container is outside of the sandboxed environment;

searching, by the container manager, for the personal container having the personal container identifier in a file system accessible by the client device;

in response to determining that the personal container is not found, the container manager creating the personal container and associating the personal container with the personal container identifier;

granting, by the container manager, the first application access to the personal container identified by the personal container identifier and the shared container identified by the shared container identifier, wherein granting the first application access to the personal and shared containers includes enabling the first application to retrieve, store, and modify data in the personal and shared containers;

granting, by the container manager, the second application access to the shared container, in response to the shared container identifier being assigned to the second application; and performing, by the first application, a read, write, or modify operation on one of the personal or shared containers.

2. The method of claim 1, further comprising:

searching memory for the personal container identified by the personal container identifier and the shared container identified by the shared container identifier;

upon a determination that the personal container identified by the personal container identifier does not exist in memory, creating the personal container in memory; and running the first application in a container in the sandboxed environment that restricts the first application to data stored in the container assigned to the first application.

3. The method of claim 2, further comprising:

upon a determination that the shared container identified by the shared container identifier does not exist in memory, creating the shared container in memory.

4. The method of claim 2, further comprising:

receiving, from the first application, personal container parameters defining the personal container, wherein the personal container is created according to the personal container parameters associated with the first application, and the personal container parameters comprise at least one of the size of the of the personal container, conditions upon which the first application is granted access to the personal container, or which of one or more users is granted to the personal container.

5. The method of claim 1, further comprising:
upon receiving an input to delete the first application, deleting the personal container identified by the personal container identifier;
determining whether the second application assigned to the shared container has been deleted; and
upon a determination that the second application assigned to the shared container has been deleted, deleting the shared container.

6. The method of claim 1, wherein the container manager maintains a container index listing the containers associated with each application.

7. The method of claim 1, wherein the container manager receives the first personal container identifier and the shared container identifier from the first application, and the container manager receives the shared container identifier from the second application.

8. The method of claim 7, wherein the container manager grants the first application access to the personal container and the shared container, the container manager grants the second application access to the shared container, and the container manager does not grant a third application access to the shared container, and the third application cannot access the shared container.

9. The method of claim 1, wherein the declaration of application entitlements is received from the first application as a result of the first application being executed.

10. The method of claim 1 wherein the shared container is located on a different computing device from the client device.

11. The method of claim 1 further comprising:
searching, by the container manager, an index listing of containers to which an application was assigned; and
deleting a container in response to determining that the application to which the container was assigned has been deleted.

12. The method of claim 1, further comprising:
determining, by a container manager, that the first application is not entitled to access a container identified in the declaration of application entitlements received from the first application; and
not granting access, by the container manager, to the container is response to the determining.

13. The method of claim 4, wherein the personal container parameters include conditions upon which the first application is granted access to the personal container and identification of a user that is permitted to access the personal container, and the container manager grants the first application access to the personal container in response to the container manager determining that the user is permitted access to the personal container, otherwise the container manager denies the first application access to the personal container.

14. A client device comprising:
a processor; and
a memory containing instructions that, when executed, cause the processor to:
receive, by a container manager, from a first application installed on the client device, a declaration of application entitlements included in the first application that identifies one or more containers assigned to the first application that the first application is entitled to access, the declaration of application entitlements including a personal container identifier identifying a personal container assigned to the first application, and a shared container identifier identifying a shared container assigned to the first application and a second application, wherein the personal container is a first specified portion of memory that is only assigned to the first application and the shared container is a second specified portion of memory that is assigned to the first application and to the second application, wherein the second application includes a declaration of entitlements having the shared container identifier indicating that the second application is entitled to access the shared container, wherein the first application is run in a sandboxed environment that restricts the first application to the data stored in the one or more containers identified in the declaration of application entitlements, and wherein the shared container is outside of the sandboxed environment;
search, by the container manager, for the personal container having the personal container identifier in a file system accessible by the client device;
in response to determining that the personal container is not found, the container manager creates the personal container and associates the personal container with the personal container identifier;
grant, by the container manager, the first application access to the personal container identified by the personal container identifier and the shared container identified by the shared container identifier, wherein granting the first application access to the personal and shared containers includes enabling the first application to retrieve, store, and modify data in the personal and shared containers;
grant, by the container manager, the second application access to the shared container, in response to the shared container identifier being assigned to the second application; and
perform, by the first application, a read, write, or modify operation on one of the personal or shared containers.

15. The client device of claim 14, wherein the instructions further cause the processor to:
search memory for the personal container identified by the personal container identifier and the shared container identified by the shared container identifier;
upon a determination that the personal container identified by the personal container identifier does not exist in memory, create the personal container in memory; and
running the first application in a container in the sandboxed environment that restricts the first application to data stored in the container assigned to the first application.

16. The client device of claim 15, wherein the instructions further cause the processor to:
upon a determination that the shared container identified by the shared container identifier does not exist in memory, create the shared container in memory.

17. The client device of claim 15, further wherein the instructions further cause the processor to:
receive, from the first application, personal container parameters defining the personal container, wherein the personal container is created according to the personal container parameters associated with the first application, and the personal container parameters comprise at least one of the size of the of the personal container, conditions upon which the first application is granted access to the personal container, or which of one or more users is granted to the personal container.

18. The client device of claim 14, wherein the instructions further cause the processor to:
   upon receiving an input to delete the first application, delete the personal container identified by the personal container identifier;
   determine whether the second application assigned to the shared container has been deleted; and
   upon a determination that the second application assigned to the shared container has been deleted, delete the shared container.

19. The client device of claim 14, wherein the container manager maintains a container index that lists the containers associated with each application.

20. A non-transitory computer readable medium comprising computer program code causing a client device to perform a method comprising:
   receiving, by a container manager, from a first application installed on the client device, a declaration of application entitlements included in the first application that identifies one or more containers assigned to the first application that the first application is entitled to access, the declaration of application entitlements including a personal container identifier identifying a personal container assigned to the first application, and a shared container identifier identifying a shared container assigned to the first application and a second application, wherein the personal container is a first specified portion of memory that is only assigned to the first application and the shared container is a second specified portion of memory that is assigned to the first application and to the second application, wherein the second application includes a declaration of entitlements having the shared container identifier indicating that the second application is entitled to access the shared container, wherein the first application is run in a sandboxed environment that restricts the first application to the data stored in the one or more containers identified in the declaration of application entitlements, and wherein the shared container is outside of the sandboxed environment;
   searching, by the container manager, for the personal container having the personal container identifier in a file system accessible by the client device;
   in response to determining that the personal container is not found, creating the personal container and associating the personal container with the personal container identifier, by the container manager;
   granting, by a container manager, the first application access to the personal container identified by the personal container identifier and the shared container identified by the shared container identifier, wherein granting the first application access to the personal and shared containers includes enabling the application to retrieve, store, and modify data in the container;
   granting, by the container manager, the second application access to the shared container, in response to the shared container identifier being assigned to the second application; and
   performing, by the first application, a read, write, or modify operation on one of the personal or shared containers.

21. The non-transitory computer readable medium of claim 20, further comprising:
   searching memory for the personal container identified by the personal container identifier and the shared container identified by the shared container identifier;
   upon a determination that the personal container identified by the personal container identifier does not exist in memory, creating the personal container in memory; and
   running the first application in a container in the sandboxed environment that restricts the first application to data stored in the container assigned to the first application.

22. The non-transitory computer readable medium of claim 21, further comprising:
   upon a determination that the shared container identified by the shared container identifier does not exist in memory, creating the shared container in memory.

23. The non-transitory computer readable medium of claim 21, further comprising:
   receiving, from the first application, personal container parameters defining the personal container, wherein the personal container is created according to the personal container parameters associated with the first application, and the personal container parameters comprise at least one of a size of the of the personal container, conditions upon which the first application is granted access to the personal container, or which of one or more users is granted to the personal container.

24. The non-transitory computer readable medium of claim 20, further comprising:
   upon receiving an input to delete the first application, deleting the personal container identified by the personal container identifier;
   determining whether the second application assigned to the shared container has been deleted; and
   upon a determination that the second application assigned to the shared container has been deleted, deleting the shared container.

25. The non-transitory computer readable medium of claim 20, wherein the container manager maintains a container index listing of the containers associated with each application.

* * * * *